US012577437B2

(12) United States Patent
Sawamura et al.

(10) Patent No.: US 12,577,437 B2
(45) Date of Patent: Mar. 17, 2026

(54) PRESSURE-SENSITIVE ADHESIVE SHEET

(71) Applicant: NITTO DENKO CORPORATION, Ibaraki (JP)

(72) Inventors: Amane Sawamura, Osaka (JP); Shuhei Yamamoto, Osaka (JP)

(73) Assignee: NITTO DENKO CORPORATION, Ibaraki (JP)

( * ) Notice: Subject to any disclaimer, the term of this patent is extended or adjusted under 35 U.S.C. 154(b) by 638 days.

(21) Appl. No.: 17/945,444

(22) Filed: Sep. 15, 2022

(65) Prior Publication Data

US 2023/0109324 A1 Apr. 6, 2023

(30) Foreign Application Priority Data

Oct. 4, 2021 (JP) ................................. 2021-163653

(51) Int. Cl.
*C09J 7/38* (2018.01)
*C09J 11/06* (2006.01)
*C09J 167/00* (2006.01)

(52) U.S. Cl.
CPC ................ *C09J 7/38* (2018.01); *C09J 11/06* (2013.01); *C09J 167/00* (2013.01); *C09J 2301/302* (2020.08); *C09J 2301/312* (2020.08); *C09J 2301/408* (2020.08); *C09J 2400/226* (2013.01)

(58) Field of Classification Search
CPC ... C09J 7/38; C09J 11/06; C09J 167/00; C09J 2301/302; C09J 2301/312; C09J 2301/408; C09J 2400/226; C09J 2203/326; C09J 2467/003; C09J 7/50; C09J 7/385; C09J 2301/1242; C09J 7/22; C08K 5/353
See application file for complete search history.

(56) References Cited

U.S. PATENT DOCUMENTS

| | | | | |
|---|---|---|---|---|
| 9,507,056 | B2 * | 11/2016 | Kawasaki | C08J 7/042 |
| 2004/0013892 | A1 | 1/2004 | Yano et al. | |
| 2007/0031660 | A1 | 2/2007 | Kanamaru et al. | |
| 2007/0184262 | A1 | 8/2007 | Yano et al. | |
| 2011/0151220 | A1 | 6/2011 | Shirai et al. | |
| 2016/0264826 | A1 | 9/2016 | Shimokawa et al. | |
| 2020/0019013 | A1 | 1/2020 | Fujita et al. | |
| 2020/0095474 | A1 * | 3/2020 | Watanabe et al. | C09J 7/383 |

FOREIGN PATENT DOCUMENTS

| | | | |
|---|---|---|---|
| JP | 6-293838 | A | 10/1994 |
| JP | 2003-119305 | A | 4/2003 |
| JP | 2007-262318 | A | 10/2007 |

(Continued)

OTHER PUBLICATIONS

US 11,572,488 B2, 02/2023, Lee et al. (withdrawn)*

(Continued)

*Primary Examiner* — Scott R. Walshon
(74) *Attorney, Agent, or Firm* — Sughrue Mion, PLLC

(57) ABSTRACT

A pressure-sensitive adhesive sheet 1 includes a plastic substrate 2, an adhesion-facilitating layer 3, and a pressure-sensitive adhesive layer 4 in the order in which they appear toward one side in a thickness direction. The adhesion-facilitating layer 3 includes an adhesive composition containing a polyester component and an oxazoline component. The pressure-sensitive adhesive layer 4 contains a water-dispersible polymer.

6 Claims, 1 Drawing Sheet

1

(56) References Cited

FOREIGN PATENT DOCUMENTS

| | | | | | |
|---|---|---|---|---|---|
| JP | 2010-174260 | A | | 8/2010 | |
| JP | 2011-149002 | A | | 8/2011 | |
| JP | 2015-87539 | A | | 5/2015 | |
| JP | 2019059892 | A | * | 4/2019 | |
| JP | 2020-90586 | A | | 6/2020 | |
| WO | 2005/116120 | A1 | | 12/2005 | |
| WO | 2018/181495 | A1 | | 10/2018 | |
| WO | WO-2019117674 | A1 | * | 6/2019 | ............... G02B 5/30 |

OTHER PUBLICATIONS

Machine Translation of JP-2019-059892A (Year: 2026).*

Extended European Search Report dated Feb. 21, 2023 in Application No. 22199480.9.

* cited by examiner

One side
Thickness direction
The other side 4
3
2

<u>1</u>

One side
Thickness direction
The other side

2

3
2

4
3
2

<u>1</u>

PRESSURE-SENSITIVE ADHESIVE SHEET

CROSS-REFERENCE TO RELATED APPLICATION

The present application claims priority from Japanese Patent Application No. 2021-163653 filed on Oct. 4, 2021, the contents of which are hereby incorporated by reference into this application.

TECHNICAL FIELD

The present invention relates to a pressure-sensitive adhesive sheet.

BACKGROUND ART

Pressure-sensitive adhesive sheets each including a substrate and a pressure-sensitive adhesive layer have conventionally been used in various technical fields. Such a pressure-sensitive adhesive layer is formed by applying a pressure-sensitive adhesive composition to a substrate. In view of the reduction in environmental loads, it is known that a water-dispersed pressure-sensitive adhesive composition (emulsion) that does not contain an organic solvent is used as the pressure-sensitive adhesive composition.

When such a water-dispersed pressure-sensitive adhesive composition is applied to a plastic substrate, the adhesiveness between the water-dispersed pressure-sensitive adhesive composition and the plastic substrate is insufficient. This may cause peeling of the composition.

In light of the foregoing, it has been considered to improve the adhesiveness between the water-dispersed pressure-sensitive adhesive composition and a plastic substrate.

Specifically, a pressure-sensitive adhesive sheet sequentially including a plastic film substrate, an undercoating layer formed of an aqueous undercoating agent containing an oxazoline group-containing acrylic aqueous emulsion, and a pressure-sensitive adhesive layer formed of a water-dispersed pressure-sensitive adhesive composition has been proposed (see, for example, Example 1 of Patent Document 1). In Patent Document 1, the undercoating layer intervenes between the plastic film substrate and the pressure-sensitive adhesive layer. This improves the anchoring properties of the water-dispersed pressure-sensitive adhesive composition to the plastic film substrate.

CITATION LIST

Patent Document

Patent Document 1: Japanese Unexamined Patent Publication No. 2011-149002

SUMMARY OF THE INVENTION

Problem to be Solved by the Invention

The undercoating layer of Patent Document 1 is formed of an oxazoline group-containing acrylic aqueous emulsion. Thus, there is a disadvantage that long-term preservation causes discoloration and poor appearance of the undercoating layer.

The present invention provides a pressure-sensitive adhesive sheet with excellent anchoring properties between the adhesion-facilitating layer and the pressure-sensitive adhesive layer and with excellent preservation properties.

Means for Solving the Problem

The present invention [1] includes a pressure-sensitive adhesive sheet comprising: a plastic substrate; an adhesion-facilitating layer; and a pressure-sensitive adhesive layer sequentially toward one side in a thickness direction, wherein the adhesion-facilitating layer contains an adhesive composition containing a polyester component and an oxazoline component, and the pressure-sensitive adhesive layer contains a water-dispersible polymer.

The present invention [2] includes the pressure-sensitive adhesive sheet described in the above-described [1], wherein the pressure-sensitive adhesive layer has a thickness of 1 μm or more and 20 μm or less.

The present invention [3] includes the pressure-sensitive adhesive sheet described in the above-described [1] or [2], wherein the pressure-sensitive adhesive layer contains a leveling agent.

The present invention [4] includes the pressure-sensitive adhesive sheet described in any one of the above-described [1] to [3], wherein, in the adhesive composition, an intensity ratio of a peak intensity derived from the oxazoline component to a peak intensity derived from the polyester component is 2 or more and 50 or less when the peak intensities are measured by TOF-SIMS.

The present invention [5] includes the pressure-sensitive adhesive sheet described in any one of the above-described [1] to [4], wherein the adhesion-facilitating layer has a thickness of 50 nm or less.

The present invention [6] includes the pressure-sensitive adhesive sheet described in any one of the above-described [1] to [5], further comprising: an adhesion-facilitating layer; and a pressure-sensitive adhesive layer sequentially toward the other side in the thickness direction of the plastic substrate.

Effect of the Invention

The pressure-sensitive adhesive sheet of the present invention includes the adhesion-facilitating layer between the plastic substrate and the pressure-sensitive adhesive layer. Further, the adhesion-facilitating layer contains the adhesive composition containing the polyester component and the oxazoline component. Thus, the pressure-sensitive adhesive sheet has excellent anchoring properties between the adhesion-facilitating layer and the pressure-sensitive adhesive layer, and excellent preservation properties.

BRIEF DESCRIPTION OF THE DRAWINGS

FIG. 2A shows a first step of preparing a plastic substrate. FIG. 2B shows a second step of disposing (forming) an adhesion-facilitating layer on one surface in the thickness direction of the plastic substrate. FIG. 2C shows a third step of disposing (forming) a pressure-sensitive adhesive layer on one surface in the thickness direction of the adhesion-facilitating layer.

DESCRIPTION OF EMBODIMENTS

Figure 1:
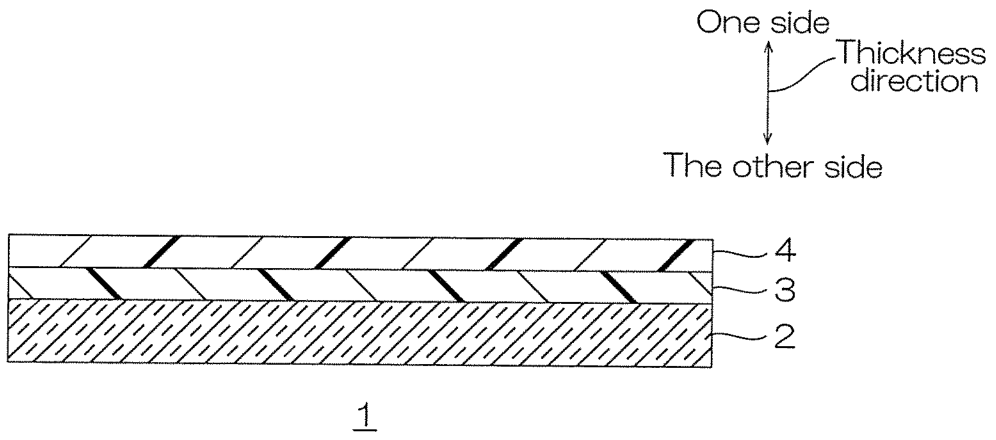
FIG. 1 shows a cross-sectional schematic view of one embodiment of the pressure-sensitive adhesive sheet of the present invention.

With reference to FIG. 1, one embodiment of the pressure-sensitive adhesive sheet of the present invention is described.

<Pressure-Sensitive Adhesive Sheet>

A pressure-sensitive adhesive sheet 1 has a film shape (including a sheet shape) with a predetermined thickness. The pressure-sensitive adhesive sheet 1 extends in a surface direction orthogonal to a thickness direction. The pressure-sensitive adhesive sheet 1 has a flat upper surface and a flat lower surface.

The pressure-sensitive adhesive sheet 1 includes a plastic substrate 2, an adhesion-facilitating layer 3, and a pressure-sensitive adhesive layer 4 in the order in which they appear toward one side in the thickness direction. Specifically, the pressure-sensitive adhesive sheet 1 includes the plastic substrate 2, the adhesion-facilitating layer 3 directly disposed on an upper surface (one surface in the thickness direction) of the plastic substrate 2, and the pressure-sensitive adhesive layer 4 directly disposed on an upper surface (one surface in the thickness direction) of the adhesion-facilitating layer 3.

The thickness of the pressure-sensitive adhesive sheet 1 is, for example, 500 μm or less, preferably 400 μm or less, more preferably 300 m or less, more preferably 200 μm or less, and, for example, 10 μm or more, more preferably 30 μm or more, more preferably 50 μm or more.

<Plastic Substrate>

The plastic substrate 2 is a substrate for ensuring the mechanical strength of the pressure-sensitive adhesive sheet 1.

The plastic substrate 2 has a film shape. The plastic substrate 2 preferably has flexibility. The plastic substrate 2 is disposed on the whole of a lower surface of the adhesion-facilitating layer 3 to be in contact with the lower surface of the adhesion-facilitating layer 3.

Examples of the plastic substrate 2 include polyester sheets (polyethylene terephthalate (PET) sheets), polyolefin sheets (for example, polyethylene sheets and polypropylene sheets), polyvinyl chloride sheets, polyimide sheets, and polyamide sheets (nylon sheets). A polyethylene terephthalate (PET) sheet is preferably used.

The plastic substrate 2 preferably has transparency. The total light transmittance (JIS K 7375-2008) of the plastic substrate 2 is, for example, 80% or more, preferably 85% or more.

The thickness of the plastic substrate 2 is, for example, 1 μm or more, and, for example, 100 μm or less.

<Adhesion-Facilitating Layer>

The adhesion-facilitating layer 3 is a layer for giving the pressure-sensitive adhesive sheet 1 anchoring properties (the anchoring properties between the adhesion-facilitating layer 3 and the pressure-sensitive adhesive layer 4, the same applies hereinafter).

The adhesion-facilitating layer 3 has a film shape. The adhesion-facilitating layer 3 is disposed on the whole of a lower surface of the pressure-sensitive adhesive layer 4 to be in contact with the lower surface of the pressure-sensitive adhesive layer 4.

The adhesion-facilitating layer 3 is formed from an adhesion-facilitating composition.

[Adhesion-Facilitating Composition]

The adhesion-facilitating composition includes an adhesive composition. In other words, the adhesion-facilitating layer 3 includes an adhesive composition.

The adhesive composition contains an oxazoline group-containing polyester polymer. The oxazoline group-containing polyester polymer contains a polyester component and an oxazoline component. In other words, the adhesive composition contains a polyester component and an oxazoline component.

In the oxazoline group-containing polyester polymer, the polyester component is a polymer in which an ester bond that is generated by a dehydration condensation of a polycarboxylic acid and a polyol couples the polycarboxylic acid and the polyol.

Examples of the polycarboxylic acid include phthalic acids (terephthalic acid and isophthalic acid), and naphthalenedicarboxylic acids. A phthalic acid is preferably used. In other words, preferably, the oxazoline group-containing polyester polymer includes a structural unit derived from a phthalic acid. Examples of the polyol include aliphatic glycols each having 2 to 8 carbon atoms.

In the oxazoline group-containing polyester polymer, the oxazoline component is a unit containing an oxazoline group. In other words, the oxazoline group-containing polyester polymer is oxazoline-modified polyester.

The oxazoline group-containing polyester polymer is produced by a reaction of a polyester component and an oxazoline component. Specifically, the oxazoline group-containing polyester polymer is produced by a reaction of water-soluble copolymerized polyester (polyester component) and oxazoline-based reactive polymer (oxazoline component) in conformity to a method described in Japanese Unexamined Patent Publication No. 1106-293838.

The mixing ratio of the oxazoline component is appropriately adjusted so that the intensity ratio of the peak intensity derived from the oxazoline component to the peak intensity derived from the polyester component falls within a predetermined range, where the peak intensities are measured by TOF-SIMS described later.

In the oxazoline group-containing polyester polymer as described above, the intensity ratio (peak intensity derived from oxazoline component/peak intensity derived from polyester component) of the peak intensity derived from the oxazoline component to the peak intensity derived from the polyester component as measured by TOF-SIMS is, for example, 1 or more in view of the improvement of the anchoring properties, preferably 2 or more, more preferably 5 or more, even more preferably 10 or more in view of the improvement of the anchoring properties, and, for example, 50 or less, preferably 30 or less, more preferably 20 or less, even more preferably 15 or less in view of the improvement of the anchoring properties.

In TOF-SIMS, a fragment ion of the polyester component is $C_7H_4O^+$ as represented by the following general formula (1) when the oxazoline group-containing polyester polymer contains a structural unit derived from phthalic acid.

[Chemical formula 1]

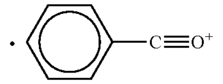

(1)

A fragment ion of the oxazoline component is $C_6H_{10}NO^+$ as represented by the following general formula (2).

(2)

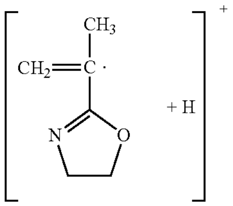

The method for measuring the above-described intensity ratio is described in detail in Examples below.

Although described in detail below, the adhesion-facilitating layer 3 is formed by applying the adhesion-facilitating composition on the one surface in the thickness direction of the plastic substrate 2, and, as necessary, heating and drying the applied composition.

The water contact angle of the adhesion-facilitating layer is, for example, 600 or more, and, for example, 75° or less, preferably 71° or less, more preferably 68° or less, even more preferably 650 or less.

The method for measuring the water contact angle is described in detail in Examples below.

The thickness of the adhesion-facilitating layer 3 is, for example, 50 nm or less, more preferably 45 nm or less, and, for example, 1 nm or more, preferably 10 nm or more.

When the thickness of the adhesion-facilitating layer 3 is the above-described upper limit or less, for example, an electronic appliance made by using the pressure-sensitive adhesive sheet 1 can be thinned.

<Pressure-Sensitive Adhesive Layer 4>

The pressure-sensitive adhesive layer 4 is a layer for making the pressure-sensitive adhesive sheet 1 adhering to an arbitrary adherend.

The pressure-sensitive adhesive layer 4 is formed from the water-dispersed pressure-sensitive adhesive composition.

[Water-Dispersed Pressure-Sensitive Adhesive Composition]

The water-dispersed pressure-sensitive adhesive composition includes a water-dispersible polymer and water. In other words, the pressure-sensitive adhesive layer 4 contains a water-dispersible polymer.

(Water-Dispersible Polymer)

Examples of the water-dispersible polymer include water-dispersible acrylic polymers, water-dispersible urethane polymers, water-dispersible polyaniline polymers, and water-dispersible polyester polymers, and preferably, a water-dispersible acrylic polymer is used.

The water-dispersible acrylic polymer is a polymer of a monomer component.

The monomer component includes alkyl (meth)acrylate as a main component. (Meth)acrylic acid is defined as acrylic acid and/or methacrylic acid.

Examples of the alkyl (meth)acrylate include an alkyl (meth)acrylate having a straight-chain or branched alkyl group having 1 to 20 carbon atoms. Examples of the alkyl (meth)acrylate include methyl (meth)acrylate, ethyl (meth) acrylate, propyl (meth)acrylate, n-butyl (meth)acrylate, isopropyl (meth)acrylate, isobutyl (meth)acrylate, s-butyl (meth)acrylate, t-butyl (meth)acrylate, pentyl (meth)acrylate, isopentyl (meth)acrylate, neopentyl (meth)acrylate, hexyl (meth)acrylate, heptyl (meth)acrylate, 2-ethylhexyl (meth)acrylate, octyl (meth)acrylate, isooctyl (meth)acrylate, nonyl (meth)acrylate, isononyl (meth)acrylate, decyl (meth)acrylate, isodecyl (meth)acrylate, undecyl (meth) acrylate, dodecyl (meth)acrylate, isotridodecyl (meth)acrylate, tetradecyl (meth)acrylate, isotetradecyl (meth)acrylate, pentadecyl (meth)acrylate, hexadecyl (meth)acrylate, heptadecyl (meth)acrylate, octadecyl (meth)acrylate, isooctadecyl (meth)acrylate, nonadecyl (meth)acrylate, and eicosyl (meth)acrylate. As the alkyl (meth)acylate, alkyl acrylate having an alkyl group having 1 to 12 carbon atoms is preferable. Methyl acrylate, butyl (meth)acrylate, and 2-ethylhexyl acrylate are more preferable.

These alkyl (meth)acrylates may be used alone or in combination of two or more. Preferably methyl acrylate and alkyl acrylate having an alkyl group having 2 to 8 carbon atoms are used in combination. More preferably methyl acrylate and 2-ethylhexyl acrylate are used in combination, and butyl acrylate and 2-ethylhexyl acrylate are used in combination. Even more preferably methyl acrylate and 2-ethylhexyl acrylate are used in combination.

The ratio of the alkyl (meth)acrylate to the monomer component is, for example, 70% by mass or more, preferably 80% by mass or more, more preferably 90% by mass or more, even more preferably 95% by mass or more, particularly preferably 97% by mass or more, and, for example, 99.5% by mass or less, preferably 99% by mass or less.

Further, the monomer component preferably includes a carboxy group-containing vinyl monomer. When the monomer component contains a carboxy group-containing vinyl monomer, the oxazoline group derived from the oxazoline component of the adhesive composition contained in the adhesion-facilitating layer 3 is allowed to react with the carboxy group derived from the above-described carboxy group-containing vinyl monomer. Thus, the adhesiveness (anchoring properties) between the adhesion-facilitating layer 3 and the pressure-sensitive adhesive layer 4 can be improved.

Examples of the carboxy group-containing vinyl monomer include acrylic acid, methacrylic acid, 2-carboxyethyl (meth)acrylate, carboxypentyl (meth)acrylate, itaconic acid, maleic acid, fumaric acid, and crotonic acid. Preferably, acrylic acid and/or methacrylic acid are used.

The ratio of the carboxy group-containing vinyl monomer to the monomer component is, for example, 0.1% by mass or more, preferably 1.0% by mass or more, more preferably 1.5% by mass or more. The ratio of the carboxy group-containing vinyl monomer in the monomer component is, for example, 10% by mass or less, preferably 5% by mass or less, more preferably 3% by mass or less.

These carboxy group-containing vinyl monomers may be used alone or in combination of two or more.

Further, the monomer component may contain one or two or more kinds of functional group-containing vinyl monomers copolymerizable with the alkyl (meth)acrylate and the carboxy group-containing vinyl monomer. The functional group-containing vinyl monomer serves to modify the acrylic polymer such as ensuring a cohesive force of the acrylic polymer and introducing a cross-linking point into the acrylic polymer.

Examples of the functional group-containing vinyl monomers (excluding the carboxy group-containing vinyl monomer) include acid anhydride vinyl monomers, hydroxyl group-containing vinyl monomers, sulfo group-containing vinyl monomers, phosphoric acid group-containing vinyl monomers, cyano group-containing vinyl monomers, and glycidyl group-containing vinyl monomers.

Examples of the acid anhydride vinyl monomer include maleic anhydride and itaconic anhydride.

Examples of the hydroxyl group-containing vinyl monomer include 2-hydroxyethyl (meth)acrylate, 2-hydroxypropyl (meth)acrylate, 2-hydroxybutyl (meth)acrylate, 3-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate, and (4-hydroxymethylcyclohexyl)methyl (meth)acrylate.

Examples of the sulfo group-containing vinyl monomer include styrene sulfonic acid, allyl sulfonic acid, sodium vinyl sulfonate, 2-(meth)acrylamide-2-methylpropane sulfonate, (meth)acrylamide propane sulfonic acid, sulfopropyl (meth)acrylate, and (meth)acryloyloxy naphthalene sulfonic acid.

Examples of the phosphate group-containing vinyl monomer include 2-hydroxyethylacryloyl phosphate.

Examples of the cyano group-containing vinyl monomer include acrylonitrile and methacrylonitrile.

Examples of the glycidyl group-containing vinyl monomer include glycidyl (meth)acrylate and 2-ethylglycidyl ether (meth)acrylate.

The ratio of the functional group-containing vinyl monomer to the monomer component is, for example, 0% by mass or more, preferably 1.0% by mass or more, more preferably 5% by mass or more, and, for example, 20% by mass or less, preferably 10% by mass or less.

These functional group-containing vinyl monomers may be used alone or in combination of two or more.

The water-dispersible acrylic polymer is obtained, for example, by emulsion polymerization of the above-described monomer component. In the emulsion polymerization, for example, first, a mixture containing a monomer component, an emulsifier, and water is stirred, thereby preparing a monomer emulsion. Next, a polymerization initiator is added to the monomer emulsion, thereby initiating a polymerization reaction. In the polymerization reaction, a chain transfer agent may be used in order to adjust a molecular weight of the acrylic polymer. As the polymerization method, dropwise polymerization or collective polymerization may be used. The polymerization time is, for example, 0.5 hours or more, and for example, 10 hours or less. The polymerization temperature is, for example, 50° C. or more, and for example, 80° C. or less.

Examples of the emulsifier include anionic emulsifiers, nonionic emulsifiers, and radically polymerizable emulsifiers (reactive emulsifiers).

Examples of the anionic emulsifier include sodium polyoxyethylene lauryl sulfate, sodium lauryl sulfate, ammonium lauryl sulfate, sodium dodecyl benzene sulfonate, sodium polyoxyethylene alkyl ether sulfate, ammonium polyoxyethylene alkyl phenyl ether sulfate, sodium polyoxyethylene alkyl phenyl ether sulfate, and sodium polyoxyethylene alkyl sulfosuccinate. Preferably, sodium polyoxyethylene alkyl ether sulfate is used.

Examples of the nonionic emulsifier include polyoxyethylene alkyl ether, polyoxyethylene alkyl phenyl ether, polyoxyethylene fatty acid ester, and polyoxyethylene polyoxypropylene block polymer.

Examples of the radically polymerizable emulsifier (reactive emulsifier) include an emulsifier in which a radically polymerizable functional group is introduced into the above-described anionic emulsifier and the above-described nonionic emulsifier. Examples of the radically polymerizable functional group include vinyl groups, propenyl groups, isopropenyl groups, vinyl ether groups, and allyl ether groups. A specific example thereof is ammonium-α-sulfonate-ω-1-(allyloxymethyl)alkyloxypolyoxyethylene.

When the reactive emulsifier is used, the acrylic polymer which is the water-dispersible polymer obtained by emulsion polymerization includes a monomer unit derived from the reactive emulsifier.

The mixing ratio of the emulsifier is, for example, 0.2 parts by mass or more, and for example, 10 parts by mass or less to 100 parts by mass of the monomer component.

These emulsifiers may be used alone or in combination of two or more.

Examples of the polymerization initiator include azo polymerization initiators and peroxide polymerization initiators.

Examples of the azo polymerization initiator include 2,2'-azobisisobutyronitrile, 2,2'-azobis(2-amidinopropane) dihydrochloride, 2,2'-azobis[2-(5-methyl-2-imidazoline-2-yl)propane]dihydrochloride, 2,2'-azobis {2-[N-(2-carboxyethyl)amidino]propane} n-hydrate, and 2,2'-azobis(N,N'-dimethyleneisobutylamidine).

Examples of the peroxide polymerization initiator include benzoyl peroxide, t-butyl hydroperoxide, and hydrogen peroxide.

As the polymerization initiator, preferably, an azo polymerization initiator is used, more preferably, 2,2'-azobis{2-[N-(2-carboxyethyl)amidino]propane} n-hydrate is used.

The mixing ratio of the polymerization initiator is, for example, 0.01 parts by mass or more, and, for example, 2 parts by mass or less to 100 parts by mass of the monomer component.

These polymerization initiators may be used alone or in combination of two or more.

Examples of the chain transfer agent include glycidylmercaptan, mercaptoacetic acid, 2-mercaptoethanol, t-lauryl mercaptan, t-dodecanethiol, thioglycolic acid, 2-ethylhexyl thioglycolic acid, and 2,3-dimercapto-1-propanol, and preferably, t-dodecanethiol is used.

The mixing ratio of the chain transfer agent is, for example, 0.001 parts by mass or more, and, for example, 0.5 parts by mass or less to 100 parts by mass of the monomer component.

These chain transfer agents may be used alone or in combination of two or more.

By such emulsion polymerization, the water-dispersible acrylic polymer is prepared as an aqueous dispersion liquid, to be specific, an aqueous dispersion liquid (emulsion) in which the water-dispersible acrylic polymer is dispersed in water. That is, the aqueous dispersion liquid is also a water-dispersed pressure-sensitive adhesive composition containing a water-dispersible polymer and water.

The weight average molecular weight (Mw) of the water-dispersible acrylic polymer to be obtained is, for example, 100000 or more, preferably 300000 or more, and for example, 5000000 or less, preferably 3000000 or less. The weight average molecular weight of the acrylic polymer is calculated in terms of polystyrene measured by gel permeation chromatography (GPC).

(Leveling Agent)

The water-dispersed pressure-sensitive adhesive composition preferably contains a leveling agent. In other words, the pressure-sensitive adhesive layer 4 preferably contains the leveling agent. When the water-dispersed pressure-sensitive adhesive composition contains the leveling agent, the wettability of the water-dispersed pressure-sensitive adhesive composition with respect to the plastic substrate 2 (adhesion-facilitating layer 3) can be improved. The improvement of the wettability allows the formation of a thin pressure-sensitive adhesive layer 4 (for example, a thickness of 20 m or less).

Examples of the leveling agent include "SURFINOL 420" (acetylene glycol ethylene oxide surfactant, manufactured by Nissin Chemical co., ltd.), "PELEX OT-P" (sodium dialkylsulfosuccinate, manufactured by Kao Corporation), "NEOCOL P" (sodium dialkylsulfosuccinate, manufactured by DKS Co., Ltd.), "NOPCO WET 50" (sulfonic acid-based anionic surfactant, manufactured by SAN NOPCO LIMITED), "SN WET 126" (modified silicone/special polyether-based surfactant, manufactured by SAN NOPCO LIMITED), "SN WET FST2" (nonionic wetting agent of polyoxyalkyleneamine, manufactured by SAN NOPCO LIMITED), "SN WET S" (nonionic wetting agent of polyoxyalkyleneamine ether, manufactured by SAN NOPCO LIMITED), and "SN WET 125" (modified silicone-based surfactant, manufactured by SAN NOPCO LIMITED).

As the leveling agent, preferably, sodium dialkylsulfosuccinate is used. When the leveling agent contains the sodium dialkylsulfosuccinate, the wettability of the water-dispersed pressure-sensitive adhesive composition with respect to the plastic substrate 2 (adhesion-facilitating layer 3) can further be improved.

In addition, the number of carbon atoms of the sodium dialkylsulfosuccinate is, for example, 4 or more, preferably 6 or more, more preferably 8 or more, and, for example, 20 or less, preferably 12 or less, more preferably 10 or less.

The leveling agent content is, for example, 0.5 parts by mass or more, preferably 1 part by mass or more, and, for example, less than 5 parts by mass, preferably 3 parts by mass or less, more preferably 2.5 parts by mass or less with respect to 100 parts by mass of the water-dispersible polymer.

These leveling agents may be used alone or in combination of two or more.

(Thickener)

The water-dispersed pressure-sensitive adhesive composition can also contain a thickener. In other words, the pressure-sensitive adhesive layer 4 can contain a thickener. When the water-dispersed pressure-sensitive adhesive composition contains a thickener, the thickener reduces the fluidity of the water-dispersed pressure-sensitive adhesive composition. Thus, repellence can be suppressed.

Examples of the thickener include polyacrylic acid-based thickeners (for example, polyacrylic acid), carboxylic acid-based copolymers, urethane-based thickeners, and polyvinyl alcohol-based thickeners. Preferably, polyacrylic acid-based thickeners are used. As the thickener, a commercially available product can also be used, and a specific example thereof is "ARON A-10H" (polyacrylic acid, manufactured by TOAGOSEI CO., LTD.).

A weight average molecular weight of the thickener measured by GPC is, for example, 50000 or more, preferably 100000 or more, more preferably 150000 or more, and, for example, 300000 or less, preferably 250000 or less.

The content of the thickener with respect to 100 parts by mass of the water-dispersible polymer is, for example, 1 part by mass or more, preferably 2 parts by mass or more, and, for example, less than 8 parts by mass, preferably 6 parts by mass or less, more preferably 4 parts by mass or less.

The thickener content with respect to 100 parts by mass of the leveling agent is, for example, 50 parts by mass or more, preferably 100 parts by mass or more, more preferably 130 parts by mass or more, and, for example, 500 parts by mass or less, preferably 300 parts by mass or less, more preferably 200 parts by mass or less.

These thickeners may be used alone or in combination of two or more.

(Another Component)

The water-dispersed pressure-sensitive adhesive composition may also contain another component. In other words, the pressure-sensitive adhesive layer 4 may also contain another component. Examples of the other component include tackifiers, silane coupling agents, cross-linking agents, fillers, antioxidants, surfactants, release aids, and antistatic agents.

Examples of the tackifier include various tackifier resins such as rosin-based resins, rosin derivative resins, petroleum-based resins, terpene-based resins, phenol-based resins, and ketone-based resins.

The tackifier content with respect to 100 parts by mass of the water-dispersible polymer is, for example, 5 parts by mass or more, and, for example, 40 parts by mass or less.

These other components may be used alone or in combination of two or more.

(Organic Solvent)

The water-dispersed pressure-sensitive adhesive composition does not contain an organic solvent. Therefore, it is possible to reduce an environmental load.

(Preparation of Water-Dispersed Pressure-Sensitive Adhesive Composition)

The water-dispersed pressure-sensitive adhesive composition can be prepared, for example, by adding each component (a leveling agent to be blended if necessary, a thickener to be blended if necessary, and another component to be blended if necessary) to an emulsion polymerization liquid of the water-dispersible polymer (the emulsion polymerization liquid contains a water-dispersible polymer and water). In addition, in the water-dispersed pressure-sensitive adhesive composition, the water content thereof is increased or decreased, thereby adjusting the solid content concentration.

The solid content concentration of the water-dispersed pressure-sensitive adhesive composition is, for example, 10% by mass or more, preferably 20% by mass or more, and for example, 60% by mass or less, preferably 40% by mass or less.

Although described in detail below, the pressure-sensitive adhesive layer 4 is disposed on the one surface in the thickness direction of the adhesion-facilitating layer 3 by applying the water-dispersed pressure-sensitive adhesive composition to a release film to form the pressure-sensitive adhesive layer 4 and transferring the formed pressure-sensitive adhesive layer 4 to the one surface in the thickness direction of the adhesion-facilitating layer 3.

The thickness of the pressure-sensitive adhesive layer 4 is, in view of the improvement of the anchoring properties, for example, 1 m or more, preferably 3 μm or more, and, for example, 30 μm or less. When the pressure-sensitive adhesive sheet 1 is used for the production of electric appliances, the thickness of the pressure-sensitive adhesive layer 4 is preferably 20 μm or less, more preferably 15 μm or less in view of the thinning of the electric appliances.

<Method of Producing Pressure-Sensitive Adhesive Sheet>

Figure 2A:
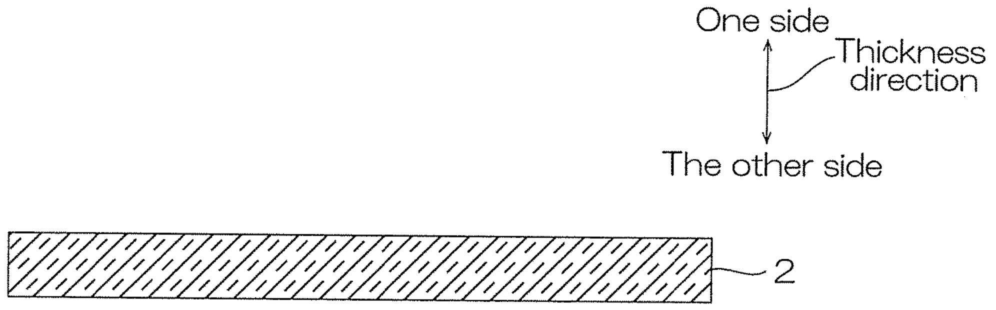
FIGS. 2A to 2C show one embodiment of a method of producing the pressure-sensitive adhesive sheet.
Figure 2B:
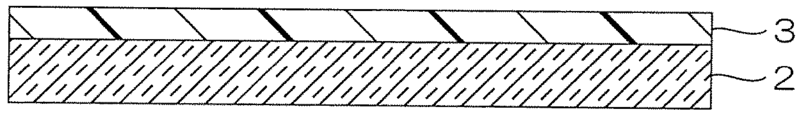
Figure 2C:
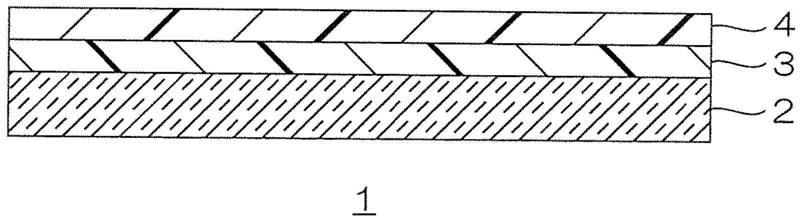

With reference to FIGS. 2A to 2C, one embodiment of a method of producing the pressure-sensitive adhesive sheet is described.

The method of producing the pressure-sensitive adhesive sheet include a first step of preparing the plastic substrate 2, a second step of disposing (forming) the adhesion-facilitating layer 3 on the one surface in the thickness direction of the plastic substrate 2, and a third step of disposing (forming) the pressure-sensitive adhesive layer 4 on the one surface in the thickness direction of the adhesion-facilitating layer 3.

[The First Step]

In the first step, as illustrated in FIG. 2A, the plastic substrate 2 is prepared.

[The Second Step]

In the second step, as illustrated in FIG. 2B, the adhesion-facilitating layer 3 is disposed (formed) on the one surface in the thickness direction of the plastic substrate 2.

To dispose (form) the adhesion-facilitating layer 3 on the one surface in the thickness direction of the plastic substrate 2, an adhesion-facilitating composition is applied to the one surface in the thickness direction of the plastic substrate 2 and, as necessary, heated and dried.

The heating temperature is, for example, 30° C. or more, preferably 60'C or more, and, for example, 150° C. or less. The heating time is, for example, 0.5 minutes or more, and, for example, 60 minutes or less.

In this manner, the adhesion-facilitating layer 3 is disposed (formed) on the one surface in the thickness direction of the plastic substrate 2.

[The Third Step]

In the third step, as illustrated in FIG. 2C, the pressure-sensitive adhesive layer 4 is disposed (formed) on the one surface in the thickness direction of the adhesion-facilitating layer 3.

To dispose (form) the pressure-sensitive adhesive layer 4 on the one surface in the thickness direction of the adhesion-facilitating layer 3, the pressure-sensitive adhesive layer 4 is prepared.

To prepare the pressure-sensitive adhesive layer 4, the water-dispersed pressure-sensitive adhesive composition is applied to one surface in the thickness direction of a release film (not illustrated) and, as necessary, heated and dried. In this manner, the pressure-sensitive adhesive layer 4 is prepared.

Then, the pressure-sensitive adhesive layer 4 is transferred to the one surface in the thickness direction of the adhesion-facilitating layer 3, thereby disposing (forming) the pressure-sensitive adhesive layer 4 on the one surface in the thickness direction of the adhesion-facilitating layer 3.

As described above, the pressure-sensitive adhesive sheet 1 is produced.

<Operations and Effects>

The pressure-sensitive adhesive sheet 1 includes the adhesion-facilitating layer 3 between the plastic substrate 2 and the pressure-sensitive adhesive layer 4. Further, the adhesion-facilitating layer 3 contains the adhesive composition containing the polyester component and the oxazoline component. Thus, the pressure-sensitive adhesive sheet 1 has excellent anchoring properties between the adhesion-facilitating layer 3 and the pressure-sensitive adhesive layer 4.

As described in detail above, when the pressure-sensitive adhesive layer 4 has a functional group (for example, the carboxy group derived from the above-described carboxy group-containing vinyl monomer) that can react with an oxazoline group, the functional group is allowed to react with the oxazoline group derived from the oxazoline component of the adhesive composition contained in the adhesion-facilitating layer 3. This reaction can further improve the adhesiveness (anchoring properties) between the adhesion-facilitating layer 3 and the pressure-sensitive adhesive layer 4.

Furthermore, the pressure-sensitive adhesive sheet 1 has excellent preservation properties. Although described in detail in Examples below, the excellent preservation properties means the properties that can suppress the discoloration of the adhesion-facilitating layer 3 caused by the preservation in a predetermined environment. In the pressure-sensitive adhesive sheet 1, the adhesion-facilitating layer 3 contains the adhesive composition containing the polyester component and the oxazoline component and does not contain a radical initiator during the polymerization. Thus, the discoloration caused by the remaining initiator with the course of time does not occur. Thus, the pressure-sensitive adhesive sheet 1 has excellent preservation properties. On the other hand, when the adhesion-facilitating layer 3 contains the acrylic adhesive of Patent Document 1, the production of the acrylic resin requires the addition of a radical initiator and the remaining radical initiator causes the discoloration. Thus, the preservation properties decrease.

Further, compared to the polyester component, the acrylic adhesive contains a small amount of polar components and is low in polarity. Thus, the interaction between the acrylic adhesive and the pressure-sensitive adhesive layer 4 decrease. On the other hand, the adhesive composition containing a polyester component contains a lot of polar groups and is high in polarity. Thus, the interaction between the acrylic adhesive and the pressure-sensitive adhesive layer 4 easily occurs. As a result, the adhesiveness to the pressure-sensitive adhesive layer 4 easily increases.

The water-dispersed pressure-sensitive adhesive composition, which forms the pressure-sensitive adhesive layer 4, does not contain an organic solvent. Thus, the environmental loads are reduced.

The pressure-sensitive adhesive sheet 1 as described above has excellent anchoring properties and preservation properties and can reduce the environmental loads, and thus can suitably be used for a variety of electronic appliances.

<Variations>

In each variation, the same members and steps as those of one embodiment are given the same reference numbers, and the detailed descriptions thereof are omitted. Each variation can have the same operations and effects as those of one embodiment unless otherwise described. Further, one embodiment and each variation can appropriately be combined.

In the above-described third step, the pressure-sensitive adhesive layer 4 is disposed (formed) on the release film and the pressure-sensitive adhesive layer 4 is transferred to the one surface in the thickness direction of the adhesion-facilitating layer 3, thereby disposing (forming) the pressure-sensitive adhesive layer 4 on the one surface in the thickness direction of the adhesion-facilitating layer 3.

Alternatively, the pressure-sensitive adhesive layer 4 can be disposed (formed) on the one surface in the thickness direction of the adhesion-facilitating layer 3 without carrying out the above-described transfer, by applying the water-dispersed pressure-sensitive adhesive composition on the one surface in the thickness direction of the adhesion-facilitating layer 3 and, as necessary, heating and drying the composition.

In view of the protection of the pressure-sensitive adhesive layer 4, a release film can be disposed on one surface in the thickness direction of the pressure-sensitive adhesive layer 4.

Alternatively, the adhesion-facilitating layer 3 and pressure-sensitive adhesive layer 4 can be included in the order in which they appear toward the other side in the thickness direction of the plastic substrate 2. In detail, the adhesion-facilitating layer 3 and pressure-sensitive adhesive layer 4 are disposed in that order on the other side in the thickness direction of the plastic substrate 2, thereby producing a pressure-sensitive adhesive sheet 1 (double sided pressure-sensitive adhesive sheet) including the pressure-sensitive adhesive layer 4, the adhesion-facilitating layer 3, the plastic substrate 2, the adhesion-facilitating layer 3, and the pressure-sensitive adhesive layer 4 in the order in which they appear toward one side in the thickness direction.

EXAMPLES

The present invention is further described with reference to Examples and Comparative Examples below. The present invention is however not limited by these Examples and Comparative Examples. The specific numerical values in mixing ratio (content ratio), property value, and parameter used in the following description can be replaced with upper limit values (numerical values defined as "or less" or "below") or lower limit values (numerical values defined as "or more" or "above") of corresponding numerical values in mixing ratio (content ratio), property value, and parameter described in the above-described "DESCRIPTION OF EMBODIMENTS".

<Details of Each Component>

The details of each component are as follows.

- AQUARON KH 1025: ammonium-α-sulfonato-ω-1-(allyloxymethyl)alkyloxypolyoxyethylene, manufactured by DKS Co., Ltd.
- Latemul E-118B: sodium polyoxyethylene alkyl ether sulfate, manufactured by Kao Corporation "VA-057": 2,2'-azobis{2-[N-(2-carboxyethyl)amidino]propane} n-hydrate, manufactured by FUJIFILM Wako Pure Chemical Corporation
- KBM-503: 3-methacryloxypropyltrimethoxysilane, manufactured by Shin-Etsu Chemical Co., Ltd.
- PELEX OT-P: sodium dialkylsulfosuccinate (8 carbon atoms), leveling agent, manufactured by Kao Corporation
- ARON A-10H: polyacrylic acid, weight-average molecular weight of 200000, manufactured by TOAGOSEI CO., LTD.
- Super Ester E-865NT: the polymerization rosin ester, ARAKAWA CHEMICAL INDUSTRIES, LTD.
- TAMANOL E-200NT: terpene-based resin, ARAKAWA CHEMICAL INDUSTRIES, LTD.

Adhesive composition A: an adhesive composition containing a polyester polymer containing an oxazoline group, the intensity ratio of the peak intensity derived from the oxazoline component to the peak intensity derived from the polyester component is 11 as measured by TOF-SIMS

- Adhesive composition B: an adhesive composition containing a polyester polymer containing an oxazoline group, the intensity ratio of the peak intensity derived from the oxazoline component to the peak intensity derived from the polyester component is 16 as measured by TOF-SIMS.
- Adhesive composition C: an adhesive composition containing a polyester polymer containing an oxazoline group, the intensity ratio of the peak intensity derived from the oxazoline component to the peak intensity derived from the polyester component is 1.4 as measured by TOF-SIMS.
- Adhesive composition D: an adhesive composition containing a polyester polymer containing an oxazoline group, the intensity ratio of the peak intensity derived from the oxazoline component to the peak intensity derived from the polyester component is 32 as measured by TOF-SIMS.
- Adhesive composition E: an adhesive composition containing a polyester polymer containing no oxazoline group, the intensity ratio of the peak intensity derived from the oxazoline component to the peak intensity derived from the polyester component is 0 as measured by TOF-SIMS.
- EPOCROS WS-700: an aqueous solution containing an oxazoline group-containing acrylic polymer, manufactured by NIPPON SHOKUBAI CO., LTD.

<Synthesis of Water-Dispersible Polymer>

Synthesis Example 1

A reaction vessel equipped with a thermometer, a stirrer, a nitrogen introduction tube, and a reflux condenser tube was charged with 0.07 parts by mass of AQUARON KH-1025 (emulsifier) and 61.1 parts by mass of distilled water. While the mixture was stirred, nitrogen substitution was carried out at a room temperature (25° C.) for one hour. Thereafter, 0.1 parts by mass of VA-057 (polymerization initiator) was further added thereto, and the temperature was raised to 60° C. Further, a mixture produced by emulsifying 85 parts by mass of 2-ethylhexyl acrylate (2EHA), 13 parts by mass of methyl acrylate (MA), 1.25 parts by mass of acrylic acid (AA), 0.75 parts by mass of methacrylic acid (MAA), 0.025 parts by mass of t-dodecanethiol (chain transfer agent), 0.02 parts by mass of KBM-503 (cross-linking agent), and 1.93 parts by mass of AQUARON KH-1025 (emulsifier) with 28 parts by mass of distilled water was added by drop thereto at 60° C. for 4 hours to carry out polymerization. Thereafter, the mixture was cooled to room temperature, then, a pH was adjusted to 6 by using 10% ammonium water as a pH adjuster. In this manner, a water-dispersible acrylic polymer was synthesized.

Synthesis Example 2

A reaction vessel equipped with a thermometer, a stirrer, a nitrogen introduction tube, and a reflux condenser tube was charged with 40 parts by mass of distilled water. While the distilled water was stirred, nitrogen substitution was carried out at a room temperature (25° C.) for one hour. Thereafter, 0.1 parts by mass of VA-057 (polymerization initiator) was added thereto and the temperature was raised to 60° C. Further, a mixture produced by emulsifying 86.58 parts by mass of butyl (meth)acrylate (BA), 9.62 parts by mass of 2-ethylhexyl acrylate (2EHA), 3.77 parts by mass of acrylic acid (AA), 0.055 parts by mass of n-dodecanethiol (chain transfer agent), 0.07 parts by mass of KBM-503 (cross-linking agent), and 2 parts by mass of Latemul E-118B (emulsifier) with 29.3 parts of distilled water was added by drop thereto at 60° C. for 4 hours to carry out polymerization. Thereafter, the mixture was cooled to room temperature, then, a pH was adjusted to 6 by using 10% ammonium water as a pH adjuster. In this manner, a water-dispersible acrylic polymer was synthesized.

<Preparation of Water-Dispersed Pressure-Sensitive Adhesive Composition>

Preparation Example 1

30 parts by mass of Super Ester E-865NT (tackifier), 3 parts by mass of ARON A-10H (thickener), and 2 parts by mass of PELEX OT-P (leveling agent) were added to 100 parts by mass of the water-dispersible acrylic polymer solid content of Synthesis Example 1, and diluted and neutralized with distilled water and 10% ammonium water, thereby preparing a water-dispersed pressure-sensitive adhesive composition (solid content concentration of 25% by mass).

Preparation Example 2

30 parts by mass of TAMANOLE-200NT (tackifier), 3 parts by mass of ARON A-10H (thickener), and 2 parts by mass of PELEX OT-P (leveling agent) were added to 100 parts of the water-dispersible acrylic polymer solid content of Synthesis Example 2, and diluted and neutralized with distilled water and 10% ammonium water, thereby preparing a water-dispersed pressure-sensitive adhesive composition (solid content concentration of 25% by mass).
<Production of Pressure-sensitive Adhesive Sheet>

Example 1

[The First Step]
A polyethylene terephthalate (PET) sheet was prepared as the plastic substrate.
[The Second Step]
The adhesive composition A was applied and dried on one surface in the thickness direction of the polyethylene terephthalate (PET) sheet, thereby disposing an adhesion-facilitating layer.
[The Third Step]
The water-dispersed pressure-sensitive adhesive composition of Preparation Example 1 was applied and dried on a surface of a release film (manufactured by FUJICO CO., LTD. and processed by SCA 1 (silicone-based release process)), thereby forming (disposing) a pressure-sensitive adhesive layer. Next, the formed pressure-sensitive adhesive layer was transferred to one surface in the thickness direction of the adhesion-facilitating layer. In this manner, a pressure-sensitive adhesive sheet was produced.

Examples 2 to 7 and Comparative Examples to 3

In the same manner as Example 1, pressure-sensitive adhesive sheets were produced. However, the formulations were changed according to Table 1. In Comparative Example 2, the second step was carried out as follows.
[The Second Step]
EPOCROS WS-700 was applied on one surface in the thickness direction of a PET film that had both sides modified by corona discharge treatment and a thickness of 50 μm (manufactured by Toray Industries, Inc., trade name "Lumirror S10") (a plastic substrate), and dried at 130° C. for one minute, thereby forming (disposing) an adhesion-facilitating layer.
<Evaluations>
[Water Contact Angle]
The water contact angle of the adhesion-facilitating layer of each of Examples and Comparative Examples was measured. Specifically, a contact angle meter (manufactured by Kyowa Interface Science Co., Ltd., trade name "CX-A type") was used to measure the contact angle by dropping 2 μL of pure water on the surface of the adhesion-facilitating layer and measuring the contact angle of the drop 5 seconds after the dropping under the conditions of 23° C. and 50% RH. The results are shown in Table 1.
[Intensity Ratio of Peak Intensity Derived from Oxazoline Component to Peak Intensity Derived from Polyester Component as Measured by TOF-SIMS]
Of each of the adhesive compositions and the acrylic adhesive (EPOCROS WS-700), the peak intensity derived from the polyester component and the peak intensity derived from the oxazoline component were measured by TOF-SIMS under the following measurement conditions. Specifically, $C_7N_4O^+$ (m/z 104) was used as the fragment ion of the polyester component and $C_6H_{10}NO^+$ (m/z 112) was used as the fragment ion of the oxazoline component.
From the obtained peak intensities, the intensity ratio of the peak intensity derived from the oxazoline component to the peak intensity derived from the polyester component was calculated. The results are shown in Table 1. The acrylic adhesive did not contain a polyester component, and thus the above-described intensity ratio was not able to be measured.
(Measurement Conditions)
Device: TOF-SIMS 5 manufactured by ION-TOF
Applied primary ion: $Bis^{2+}$
Primary ion accelerating voltage: 25 kV
Measured area: 300 μm square (a charge neutralizing gun was used for the measurement)
[Anchoring Properties]
A sample was produced by cutting the pressure-sensitive adhesive sheet of each of Examples and Comparative Examples into a piece with a width of 20 mm and a length of 100 m. Next, the plastic substrate of the sample and a backing plate were bonded with a double sided tape. Next, vertical slits were made at 10 mm intervals only in the pressure-sensitive adhesive layer in a longitudinal direction.
A single-sided tape No. 315 (manufactured by Nitto Denko Corporation) was bonded to the pressure-sensitive adhesive surface by pressure bonding operation of reciprocating a 2 Kg roller once, and cured at a room temperature for 30 minutes. Next, the single-sided tape No. 315 was peeled off from the pressure-sensitive adhesive surface to measure the peeling strength (unit: N/20 mm) between the adhesion-facilitating layer and the pressure-sensitive adhesive layer. The results are shown in Table 1.
Further, the anchoring properties were evaluated based on the following criteria. The results are shown in Table 1.
(Criteria)
Good: The peeling strength was 15 or more.
Fair: The peeling strength was 13 or more and less than 15.
Bad: The peeling strength was less than 13.
[Anti-Blocking Properties]
Two adhesion-facilitating layers (films each including the plastic substrate and adhesion-facilitating layer after the second step) of each of Examples and Comparative Examples were prepared, and the two adhesion-facilitating layers were bonded each other by pressure bonding operation at 80° C. and 0.4 MPa for 30 minutes. Thereafter, the layers were peeled to evaluate the anti-blocking properties based on the following criteria. The results are shown in Table 1.
(Criteria)
Excellent: The layers were easily peeled from each other.
Good: The layers were peeled from each other.
Fair: The layers were difficult to be peeled from each other.
Bad: The layers failed to be peeled from each other.
[Appearance]
The adhesion-facilitating layers (films each including the plastic substrate and adhesion-facilitating layer after the second step) of each of Examples and Comparative Examples were preserved under the conditions of 80° C./90% for one week, and thereafter ten of the adhesion-facilitating layers were laminated to evaluate the appearance based on the following criteria. The results are shown in Table 1.
Good: A change in color was not confirmed.
Bad: A change in color was confirmed.

TABLE 1

| Example-Comparative Example No. | | | Example 1 | Example 2 | Example 3 | Example 4 | Example 5 |
|---|---|---|---|---|---|---|---|
| Plastic substrate | | | PET | PET | PET | PET | PET |
| Adhesion-facilitating layer | Adhesive composition (containing an oxazoline component) | Adhesive composition A | ○ | — | ○ | ○ | ○ |
| | | Adhesive composition B | — | ○ | — | — | — |
| | | Adhesive composition C | — | — | — | — | — |
| | | Adhesive composition D | — | — | — | — | — |
| | Adhesive composition (containing no oxazoline group) | Adhesive composition E | — | — | — | — | — |
| | Acrylic adhesive | EPOCROS WS-700 | — | — | — | — | — |
| | Intensity ratio of peak intensity derived from oxazoline component to peak intensity derived from polyester component measured by TOF-SIMS | | 11 | 16 | 11 | 11 | 11 |
| | Thickness (nm) | | 40 | 40 | 40 | 40 | 40 |
| | Water contact angle (°) | | 62.9 | 70.3 | 62.9 | 62.9 | 62.9 |
| Pressure-sensitive adhesive layer | Water-dispersed pressure-sensitive adhesive composition | Preparation Ex. 1 | ○ | ○ | ○ | ○ | — |
| | | Preparation Ex. 2 | — | — | — | — | ○ |
| | Thickness (μm) | | 5 | 5 | 10 | 25 | 5 |
| Evaluations | Anchoring properties | Peeling strength (N/20 mm) | 16.5 | 15.7 | 16.7 | 20.8 | 15.9 |
| | | Determination | Good | Good | Good | Good | Good |
| | Anti-blocking properties | | Good | Good | Good | Good | Good |
| | Appearance | | Good | Good | Good | Good | Good |

| Example-Comparative Example No. | | | Example 6 | Exam ple 7 | Comp. Ex. 1 | Comp. Ex. 2 | Comp. Ex. 3 |
|---|---|---|---|---|---|---|---|
| Plastic substrate | | | PET | PET | PET | PET | PET |
| Adhesion-facilitating layer | Adhesive composition (containing an oxazoline component) | Adhesive composition A | — | — | — | — | — |
| | | Adhesive composition B | — | — | — | — | — |
| | | Adhesive composition C | ○ | — | — | — | — |
| | | Adhesive composition D | — | ○ | — | — | — |
| | Adhesive composition (containing no oxazoline group) | Adhesive composition E | — | — | — | — | ○ |
| | Acrylic adhesive | EPOCROS WS-700 | — | — | — | ○ | — |
| | Intensity ratio of peak intensity derived from oxazoline component to peak intensity derived from polyester component measured by TOF-SIMS | | 1.4 | 32 | — | Unmeasurable | — |
| | Thickness (nm) | | 40 | 40 | — | 1000 | 40 |
| | Water contact angle (°) | | 67.5 | 72.6 | 119 | 75 | 72.4 |
| | Water-dispersed pressure-sensitive adhesive composition | Preparation Ex. 1 | ○ | ○ | ○ | ○ | ○ |
| | | Preparation Ex. 2 | — | — | — | — | — |
| | Thickness (μm) | | 5 | 5 | 5 | 5 | 5 |
| | Anchoring properties | Peeling strength (N/20 mm) | 14.3 | 16.1 | 11.9 | 16.8 | 12.4 |
| | | Determination | Fair | Good | Bad | Good | Bad |
| | Anti-blocking properties | | Good | Fair | Excellent | Fair | Good |
| | Appearance | | Good | Good | — | Bad | Good |

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICATION

The pressure-sensitive adhesive sheet of the present invention can suitably be used particularly for producing electronic appliances.

DESCRIPTION OF REFERENCE NUMERALS

1 pressure-sensitive adhesive sheet
2 plastic substrate
3 adhesion-facilitating layer
4 pressure-sensitive adhesive layer

The invention claimed is:

1. A pressure-sensitive adhesive sheet comprising:
a plastic substrate;
an adhesion-facilitating layer; and
a pressure-sensitive adhesive layer sequentially toward one side in a thickness direction, wherein
the adhesion-facilitating layer contains an adhesive composition containing an oxazoline group-containing polyester polymer containing a polyester component and an oxazoline component,
the pressure-sensitive adhesive layer contains a water-dispersible polymer,
the water-dispersible polymer includes a water-dispersible acrylic polymer,
the water-dispersible acrylic polymer is a polymer of a monomer component, the monomer component contains a carboxy group-containing vinyl monomer, and a ratio of the carboxy group-containing vinyl monomer to the monomer component is 0.1% by mass or more and 10% by mass or less.

2. The pressure-sensitive adhesive sheet according to claim 1, wherein the pressure-sensitive adhesive layer has a thickness of 1 μm or more and 20 μm or less.

3. The pressure-sensitive adhesive sheet according to claim 1, wherein the pressure-sensitive adhesive layer contains a leveling agent.

4. The pressure-sensitive adhesive sheet according to claim 1, wherein, in the adhesive composition, an intensity ratio of a peak intensity derived from the oxazoline component to a peak intensity derived from the polyester component is 2 or more and 50 or less when the peak intensities are measured by TOF-SIMS.

5. The pressure-sensitive adhesive sheet according to claim 1, wherein the adhesion-facilitating layer has a thickness of 50 nm or less.

6. The pressure-sensitive adhesive sheet according to claim 1, further comprising:

a second adhesion-facilitating layer; and a second pressure-sensitive adhesive layer sequentially toward the other side in the thickness direction of the plastic substrate.

* * * * *